(12) United States Patent
Nishimura et al.

(10) Patent No.: US 7,164,392 B2
(45) Date of Patent: Jan. 16, 2007

(54) MATERIAL PRESENTATION DEVICE

(75) Inventors: Mitsuyoshi Nishimura, Saitama (JP); Junichi Yokoyama, Saitama (JP)

(73) Assignee: Fujinon Corporation, Saitama (JP)

( * ) Notice: Subject to any disclaimer, the term of this patent is extended or adjusted under 35 U.S.C. 154(b) by 399 days.

(21) Appl. No.: 10/619,079

(22) Filed: Jul. 15, 2003

(65) Prior Publication Data
US 2004/0070552 A1    Apr. 15, 2004

(30) Foreign Application Priority Data
Aug. 6, 2002 (JP) ............................. 2002-228631
Aug. 6, 2002 (JP) ............................. 2002-228636

(51) Int. Cl.
*G09G 5/00* (2006.01)
(52) U.S. Cl. ...................... 345/2.1; 345/173; 345/179; 348/14.01
(58) Field of Classification Search ........ 345/173–182, 345/1.1, 2.1, 156; 178/19.01, 19.06; 348/14.01
See application file for complete search history.

(56) References Cited

U.S. PATENT DOCUMENTS

| | | | | |
|---|---|---|---|---|
| 4,371,893 A | * | 2/1983 | Rabeisen | ..................... 348/707 |
| 4,400,724 A | * | 8/1983 | Fields | ........................ 348/14.1 |
| 4,430,526 A | * | 2/1984 | Brown et al. | ................ 345/175 |
| 5,025,314 A | * | 6/1991 | Tang et al. | ............... 348/14.08 |
| 5,239,373 A | * | 8/1993 | Tang et al. | ............... 348/14.01 |
| 5,444,476 A | * | 8/1995 | Conway | ..................... 348/14.1 |
| 5,790,114 A | * | 8/1998 | Geaghan et al. | ............. 715/763 |
| 6,554,434 B1 | * | 4/2003 | Sciammarella et al. | ........ 353/98 |

FOREIGN PATENT DOCUMENTS

| | | |
|---|---|---|
| JP | A 2000-341588 | 12/2000 |
| JP | B2 3201707 | 6/2001 |

* cited by examiner

*Primary Examiner*—Amr A. Awad
*Assistant Examiner*—Steven Holton
(74) *Attorney, Agent, or Firm*—Oliff & Berridge, PLC

(57) ABSTRACT

A material presentation device connecting at least two material presentation devices to each other, comprises a first selecting device for selecting one image as a main image from plural images composed of an image output by another material presentation device, a camera image of a material on a material mounting pedestal, which is photographed by a photographing section, an image stored in a memory device, and an external image output by an external device connected thereto, a second selecting device capable of selecting no image or one image as an additional image from plural images composed of a camera image of a material on the material mounting pedestal, which is photographed by the photographing section, an image stored in the memory device and an external image output by the external device, a point image generating device for generating a point image from point information which is subtracted from an image photographed by the photographing section, an image synthesizing section for synthesizing the additional image selected by the second selecting device and the point image with the main image selected by the first selecting device, a display image selecting device for selecting one image from an image output by another material presentation device and the image synthesized by the image synthesizing section, an image displaying section for displaying the image selected by the display image selecting device, and an image outputting section for outputting the image synthesized by the image synthesizing section.

2 Claims, 12 Drawing Sheets functional block diagram of device 101 flow chart of device 101

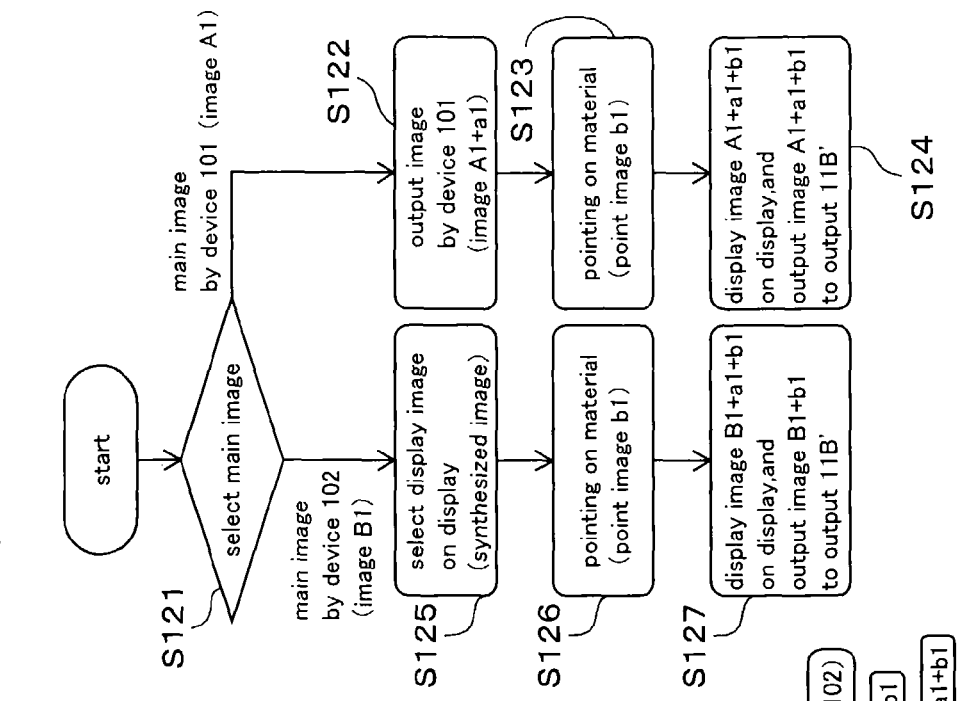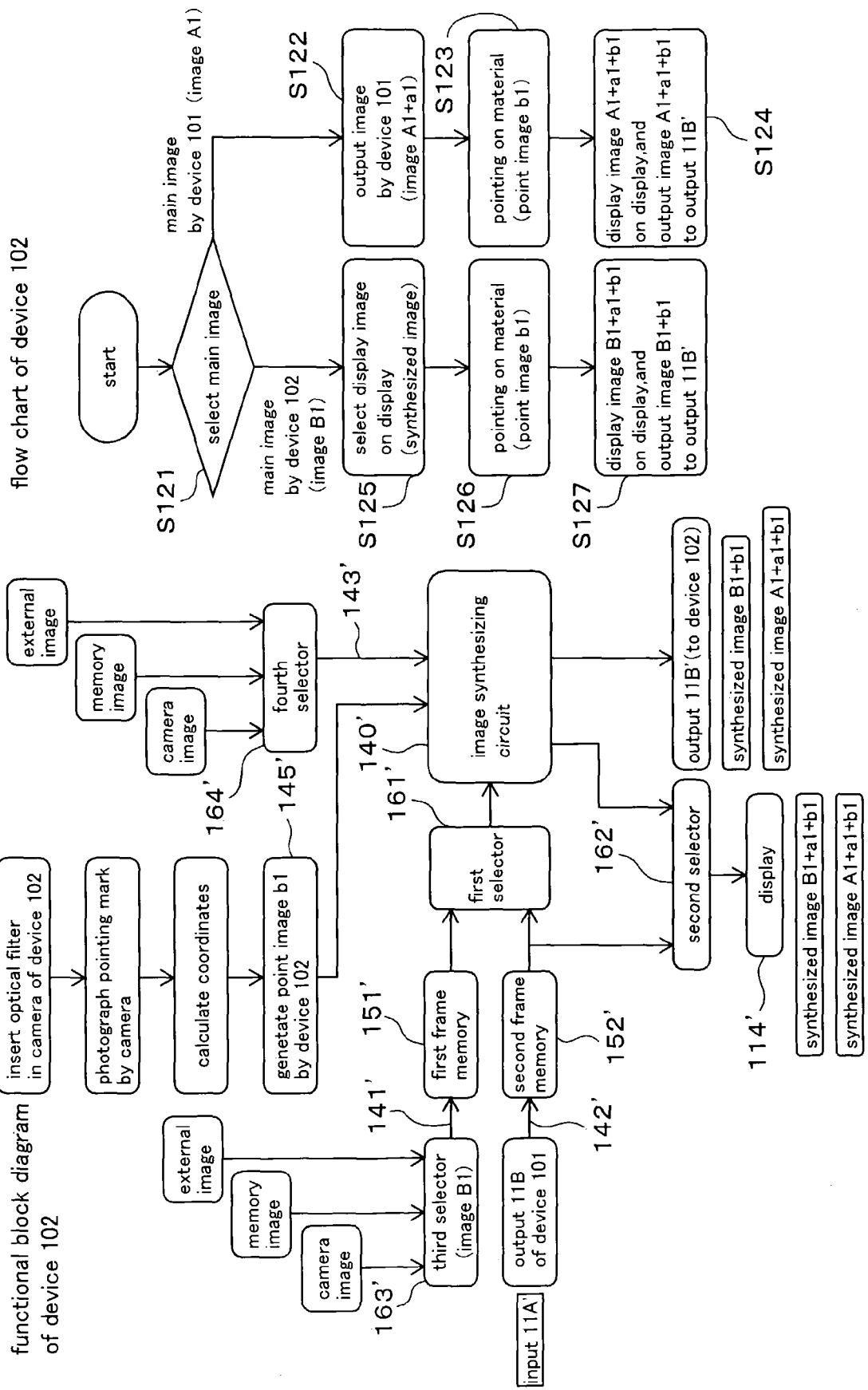

functional block diagram of device 201 flow chart of device 201 flow chart of device 202 functional block diagram of device 202

Fig. 12
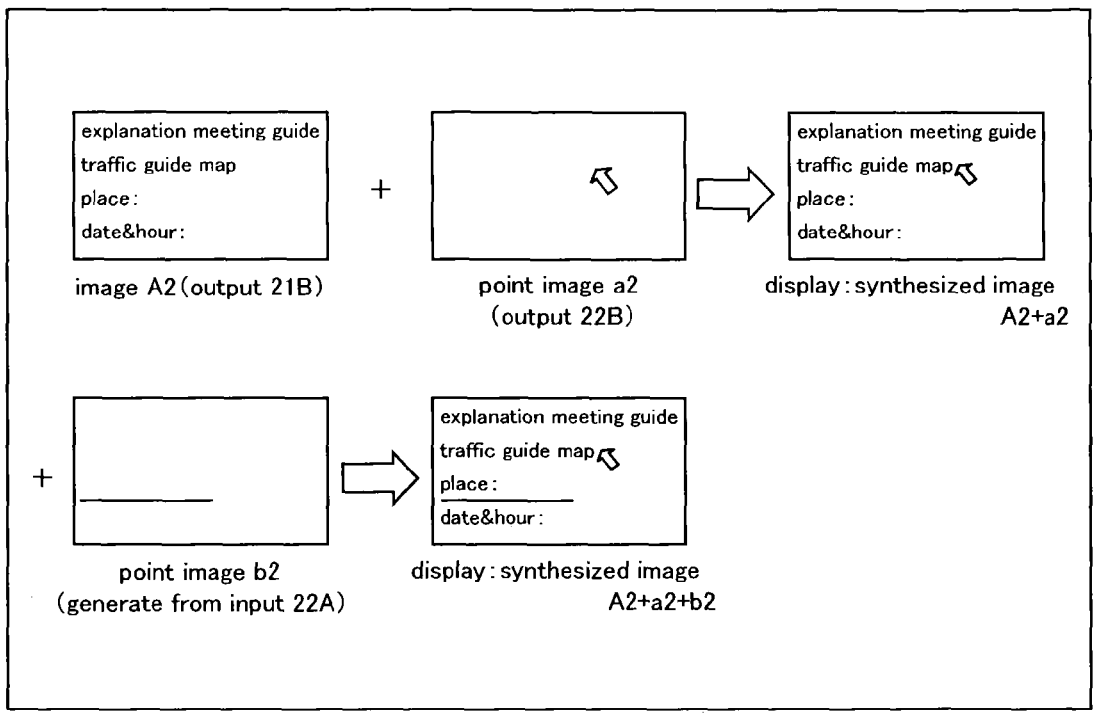
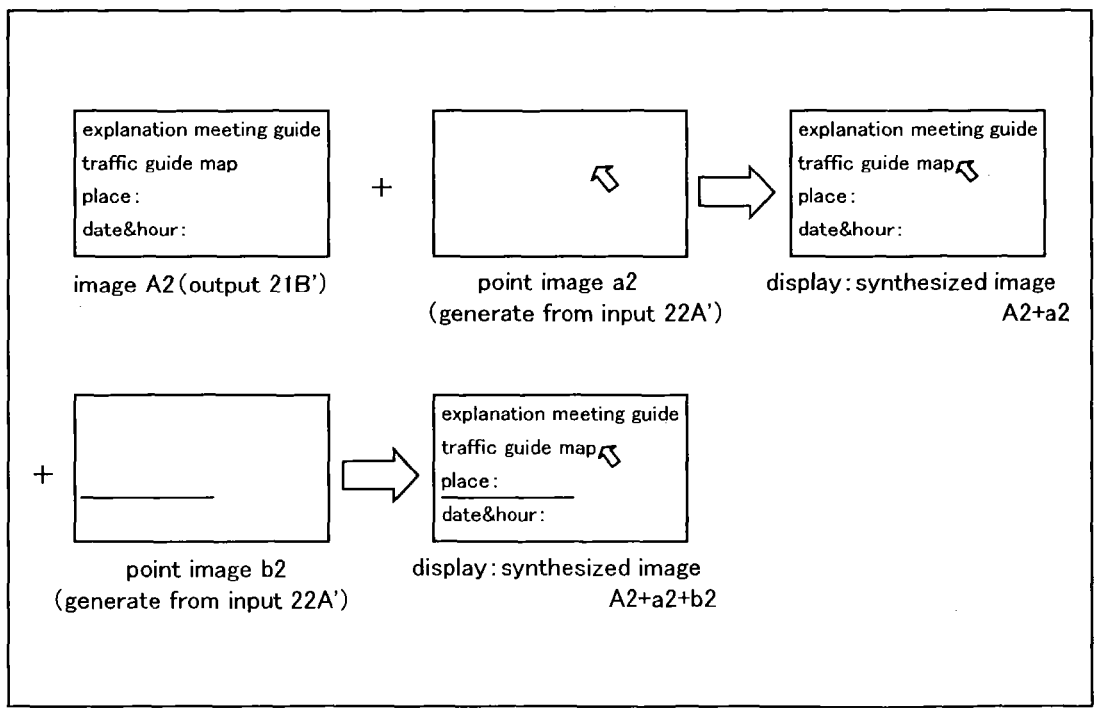

MATERIAL PRESENTATION DEVICE

BACKGROUND OF THE INVENTION

1. Field of the Invention

The present invention relates to a material presentation device which is equipped with a photographing section and an image displaying section, wherein at least two material presentation devices perform communications of images with each other and share images which are displayed on the image displaying sections.

2. Description of the Related Art

In recent years, material presentation devices have been widely used as image displaying devices for presentations instead of OHPs (overhead projectors). These material presentation devices are used so that a photographing section, which is equipped with a camera, photographs a material, and the image photographed by the photographing section is projected onto a monitor and a screen as a reference image. In this case, documents and pictures can be used as materials as they are, and three-dimensional objects, for example, models, can be used as objects. The material presentation devices are thereby much more useful than OHPs. Some of material presentation devices can receive images from external devices, for example, personal computers, and can output the images.

In a presentation, generally, a presenter often gives an explanation by indicating a specific part of a reference image with a pointer. In this case, the presenter performs a pointing operation on an image, which is output by an external device, either by using the external device on the side thereof (for example, operating a pointer with a mouse when using a personal computer) or by directly indicating a part of a display image on a monitor or a screen. In the former case, however, the operation is performed away from a material presentation device, thereby being troublesome. The latter case is not preferable since the view of the display image is blocked. To overcome the above problems, a method, in which a photographing section photographs the state in which a pointing operation is performed and a point image is synthesized with an external image which is output by an external device, is disclosed in Japanese Patent Unexamined Application Publication No. 2000-341588. A material presentation device, which is of increased value by the above method, is disclosed in Japanese Patent No. 3201707.

In meetings or in educational presentations, for example, communications and discussions are given with reference to common images between two persons who are far away from each other. Material presentation devices are under consideration as tools, which are used in the above cases, for mutual communications of images. In this case, if indicating marks or underlines were added to the images, it may be easy to understand the communications and may be flexible to have communications. It may be possible to add another image to the images by an image synthesizing function such as of the material presentation devices which are disclosed in the above publications. These material presentation devices, however, simply output and display a synthesized image, whereby it is not possible for two or more material presentation devices to be used so that these devices repeatedly synthesize additional images with each other and share synthesized images each time. The above function may be executed by adding exclusive image processing devices thereto, whereby, however, the system in which these devices are used is complicated, and the operations thereof are troublesome. In addition, the system incurs high cost due to the exclusive image processing devices.

Thus, it was supposed that the material presentation devices may be equipped with an image synthesizing section, and communicate and share a synthesized image among each other. In this system, however, capacities for image data which is communicated with each other are large, whereby communications and displaying images are time consuming, and these actions may not be executed smoothly.

SUMMARY OF THE INVENTION

An object of the present invention according to an aspect of the invention is to provide a material presentation device which enables synthesizing an additional image or a point image with a main image and communicating among each other using two or more material presentation devices, and can realize these functions with a simple structure.

An object of the present invention according to another aspect of the invention is to provide a material presentation device which enables synthesizing an additional image with a main image and sharing a synthesized image each time, can realize these functions by easy operations with a simple structure, and can execute these actions smoothly.

The present invention provides a material presentation device connecting at least two material presentation devices to each other, comprising: a first selecting device for selecting one image as a main image from plural images composed of an image output by another material presentation device, a camera image of a material on a material mounting pedestal, which is photographed by a photographing section, an image stored in a memory device, and an external image output by an external device connected thereto; a second selecting device capable of selecting no image or one image as an additional image from plural images composed of a camera image of a material on the material mounting pedestal, which is photographed by the photographing section, an image stored in the memory device and an external image output by the external device; a point image generating device for generating a point image from point information which is subtracted from an image photographed by the photographing section; an image synthesizing section for synthesizing the additional image selected by the second selecting device and the point image with the main image selected by the first selecting device; a display image selecting device for selecting one image from an image output by another material presentation device and the image synthesized by the image synthesizing section; an image displaying section for displaying the image selected by the display image selecting device; and an image outputting section for outputting the image synthesized by the image synthesizing section.

According to the present invention, for example, the material presentation devices are placed at two positions which are far away from each other, and forms of information exchanges such as in meetings or in educational presentations can be executed while an image, which is displayed on both image displaying sections, is shared. The "sharing an image" of the present invention is a state in which the respective material presentation devices can maintain the same image, and the same image can be seen simultaneously. In the present invention, a synthesized image, which is made by synthesizing the additional image and the point image with the main image, can be shared. The main image is an original image to which the additional image or the point image is added. An image is selected as the main image from the above images of one material presentation device by the first selecting device thereof, and the image displaying devices are selected appropriately, whereby the selected main image is displayed on the image displaying sections of both material presentation devices. The additional image or the point image can be added to the main image by using both material presentation devices. The additional image is one which is selected from the above images by the second selecting device. The point image is generated from the point information which is subtracted from the image photographed by the photographing section.

According to the present invention, in the above manner, plural users can add additional images or point images to the main image, can exchange and share the synthesized image with each other, and simultaneously communicate with each other based on the shared image. The material presentation device itself has the above synthesized image displaying function, whereby conventional image processing devices are not necessary, a structure of a material presentation device for sharing an image is designed simply, and operation thereof can be easy.

The present invention further provides a material presentation device connecting at least two material presentation devices to each other, comprising: a selecting device for selecting one image as a main image from plural images composed of an image output by another material presentation device, a camera image of a material on a material mounting pedestal, which is photographed by a photographing section, an image stored in a memory device, and an external image output by an external device connected thereto; a point image generating device for generating a point image as an additional image from point information output by another material presentation device and point information which is subtracted from an image photographed by the photographing section; an image synthesizing section for synthesizing the main image selected by the selecting device with the additional image generated by the point image generating device; an image displaying section for displaying the image synthesized by the image synthesizing section; a first outputting section for outputting the main image which is selected from plural images composed of the camera image of a material on the material mounting pedestal, which is photographed by the photographing section, the image stored in the memory device, and the external image output by the external device connected thereto; a second outputting section for outputting point information which is subtracted from the image photographed by the photographing section; a first inputting section for inputting the main image which is output by the first outputting section of another material presentation device; and a second inputting section for inputting point information which is output by the second outputting section of another material presentation device.

According to the present invention, for example, the material presentation devices are placed at two positions which are far away from each other, and forms of information exchange such as in meetings or educational presentations can be executed while an image, which is displayed on both image displaying sections, is shared. The "sharing an image" of the present invention is a method in which the respective material presentation devices can maintain the same image and the same image can be seen simultaneously. In the present invention, a synthesized image, which is made by synthesizing the point image with the main image, can be shared. The main image is an original image to which the point image is added. The point image is one image based on the point information photographed by the photographing section.

According to the present invention, an image is selected as the main image from the above images of one material presentation device by the selecting device thereof. On the part of one material presentation device, the main image is input into the image synthesizing section, and is displayed on the image displaying section. Also, the main image is input from the first outputting section into the first inputting section of another material presentation device, and is displayed on the image displaying section thereof, whereby the main image is shared with both material presentation devices. Next, a pointing operation is performed on the main image using one material presentation device, and the pointing action is photographed by the photographing section thereof. On the part of one material presentation device, a point image is thereby generated based on the point information by the point image generating device, and the point image is synthesized with the main image by the image synthesizing device thereof. The point information is output from the second outputting section of one material presentation device into the second inputting section of another material presentation device. On the part of another material presentation device, a point image is generated based on the point information by the point image generating device, and the point image is synthesized with the main image by the image synthesizing device, whereby the synthesized image which is made by synthesizing the point image with the main image is displayed on the image displaying sections of both material presentation devices. In the present invention, these operations are repeatedly performed among each other by the material presentation devices. The point information of the present invention is information which is needed to generate the point image, which is, for example, related to the shape, position, size, and color of the point image, and only the point information is exchanged with each other by the material presentation devices.

According to the present invention, in the above manner, plural users can add additional images or point images to the main image, exchange and share the synthesized image with each other, and simultaneously communicate with each other based on the shared image. The material presentation device itself has the above synthesized image displaying function, whereby conventional image processing devices are not necessary, a structure of the material presentation device for sharing an image is designed simply, and operation thereof can be easy. In addition, instead of outputting the synthesized image, which is made by synthesizing the point image with the main image, to another material presentation device, only the point information which is needed to generate the point image is output, another material presentation device which accepts the point information generates a point image by the point image generating device, and synthesizes the point image with the main image by the image synthesizing section. Thus, the output point information is much smaller than images (image data) in information content and in the capacity therefor, whereby communication traffic is greatly reduced. As a result, it is possible to reduce the time for communicating and displaying images, and to make image displaying actions smoother.

BRIEF DESCRIPTION OF THE DRAWINGS

FIG. 4A is a functional block diagram of the other material presentation device, and FIG. 4B is a flow chart showing an image synthesizing operation thereof in the first embodiment according to the present invention;

FIG. 12 is a flow chart of an image, showing an image synthesizing process in the second embodiment according to the present invention;

DESCRIPTION OF THE PREFERRED EMBODIMENTS

Embodiments of the present invention will be described hereinafter with reference to the drawings.

(1) First Embodiment (A) Constitution of Material Presentation Device

Figure 1:
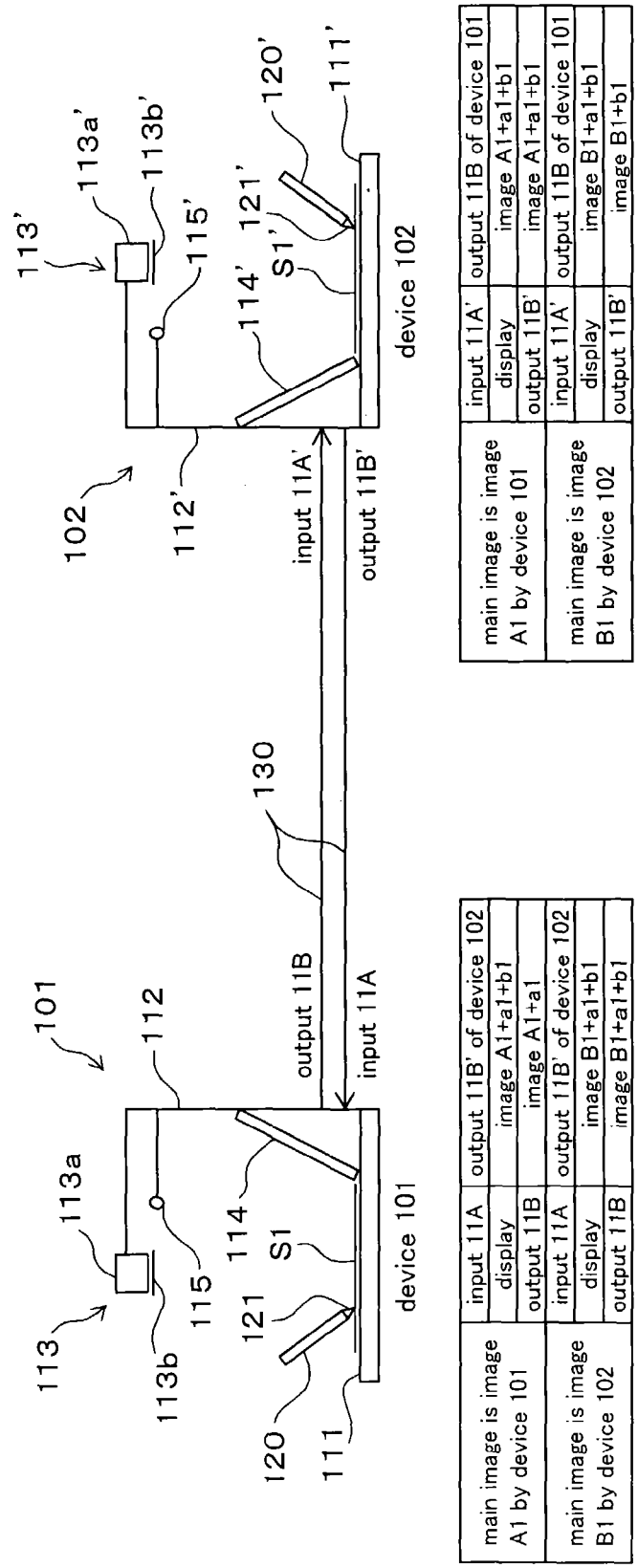
FIG. 1 is a schematic diagram showing a state in which image data and voice data are communicated using two material presentation devices in the first embodiment according to the present invention.

FIG. 1 systematically shows a state in which image data and voice data are communicated by material presentation devices 101 and 102 (hereinafter these material presentation devices are called devices 101 and 102 for short) in a first embodiment according to the present invention. The devices 101 and 102 have the substantially same structure, and reference numerals of the components in the device 102 are attached with an affix"'" to the reference numerals of the components in the device 101. Since the components in the device 102 are identical to those of the device 101, detailed explanations for the components in the device 102 will be omitted. The device 101 is equipped with a material mounting pedestal 111, a photographing section 113, provided on the material mounting pedestal 111 via an arm 112, which photographs a material S1, for example, a document, on the material mounting pedestal 111, a display (image displaying section) 114, and a speaker-microphone 115 which inputs and outputs voice. The display 114 is provided at the back side of the set position of the material on the material mounting pedestal 111, and is set at a backward inclined attitude toward a user (not shown) who is in front of the material mounting pedestal 111.

The photographing section 113 is equipped with a camera 113a and an optical filter 113b which enables the camera 113a to photograph only infrared light. The optical filter 113b is removably placed in the photographing optical path of the camera 113a. The optical filter 113b is switched between a state of being placed in the photographing optical path and a state of being removed therefrom by hand or by automatic control. In the state of being removed therefrom, the camera 113a photographs the material S1, and a photographed image by the camera 113a is displayed on the display 114.

In FIG. 1, reference numeral 120 denotes a pen which is used to indicate, for example, a specific part of the material S1 by the user. A pointing mark 121 is provided at the leading tip portion of the pen 120 which emits infrared light. The pointing mark 121 is composed of a light emitting diode (LED) which emits light by changing a switch to ON. The user performs a pointing operation on a required part with the pointing mark 121 of the pen 120.

An image which is displayed on the displays 114 and 114' of the devices 101 and 102 is input into and output to each other, and the same image is displayed on the displays 114 and 114'. That is, the same image is shared with the devices 101 and 102. The voice data which are input into the speaker-microphones 115 and 115' are input into and output to each other, and the voice data which are input into the speaker-microphone 115 of the device 101 are output from the speaker-microphone 115' of the device 102. A mutual communicating device for images and voice data are selected appropriately according to the set positions of the devices 101 and 102 or interfaces. The mutual communicating device is composed of a cable 130 for communication in FIG. 1.

The above devices 101 and 102 enable communicating using speaker-microphones 115 and 115' while sharing an image displayed on the displays 114 and 114', enable synthesizing of an additional image with a main image displayed on the displays 114 and 114' among each other, and enable sharing of the synthesized image each time.

The main image is shared by the devices 101 and 102. On the part of the device 101, a camera image (an object of the camera image is the material S1, etc.) which is photographed by the camera 113a is selected as the main image. A memory image is stored in an internal memory device which is provided in the device 101 or in an external memory device which is removably placed in the device 101. An external image which is generated from an external device, for example, a personal computer, connected to device 101, is selected as the main image. An image by the device 102, which is input from the device 102 into the device 101, is selected as the main image. The camera image, the memory image or the external image by the device 101 is selected as an additional image which is synthesized with the main image. The image displayed on the display 114 is set to be an image either by the device 101 itself or by the device 102.

Figure 2:
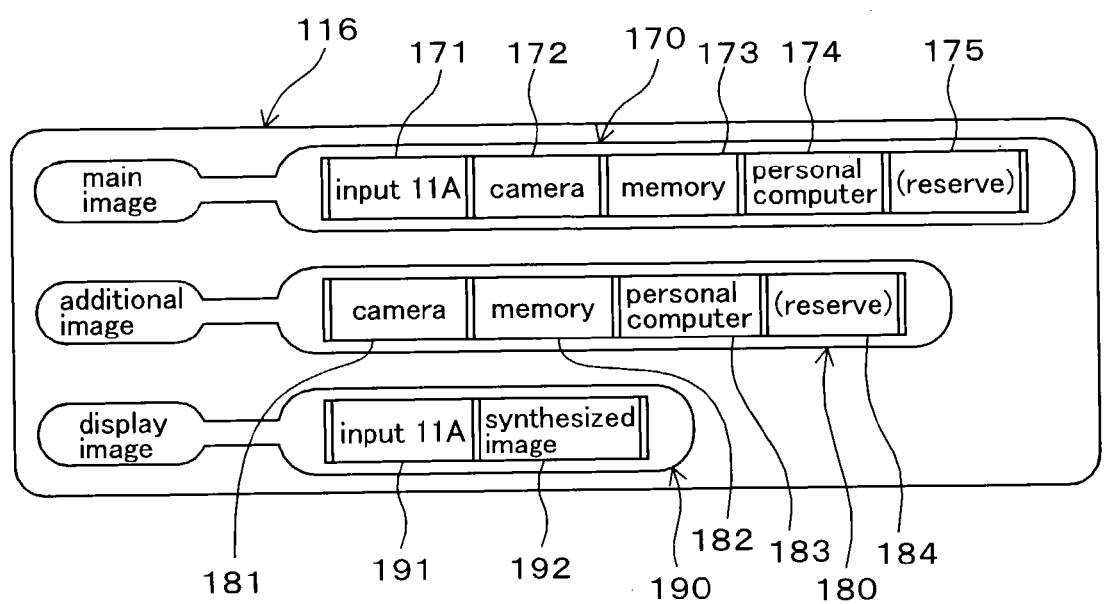
FIG. 2 is an image selecting panel which is provided on the material presentation device in the first embodiment according to the present invention.

As shown in FIG. 2, an image selecting panels 116 is provided on the devices 101. The image selecting panel 116 has buttons which decide which of the above images is respectively selected as the main image, which of the above images is selected as the additional image, and which of images by the device 101 itself and by the device 102 is displayed on the display 114.

Buttons for selecting the main image are provided on a main image selecting section (first selecting device) 170, and are composed of an input 11A button 171 for selecting the output image from the device 102, a camera button 172 for selecting the camera image by the device 101, a memory button 173 for selecting the memory image of the device 101, a personal computer button 174 for selecting the external image which is input from the external device (in this case, a personal computer), and a reserve button 175 for selecting one image other than these images.

Buttons for selecting additional images are provided on an additional image selecting section (second selecting device) 180, and are composed of a camera button 181 for selecting camera images, a memory button 182 for selecting memory images, a personal computer button 183 for selecting external images, and a reserve button 184 for selecting images other than these images. In the case of selecting the additional image, the above images are of the device 101 itself. Buttons for selecting the image displayed on the display 114 are provided on a display image selecting section (display image selecting device) 190, and are composed of an input 11A button 191 for selecting the output image from the device 102 and a synthesizing image button 192 for selecting the synthesized image.

Figure 3A:
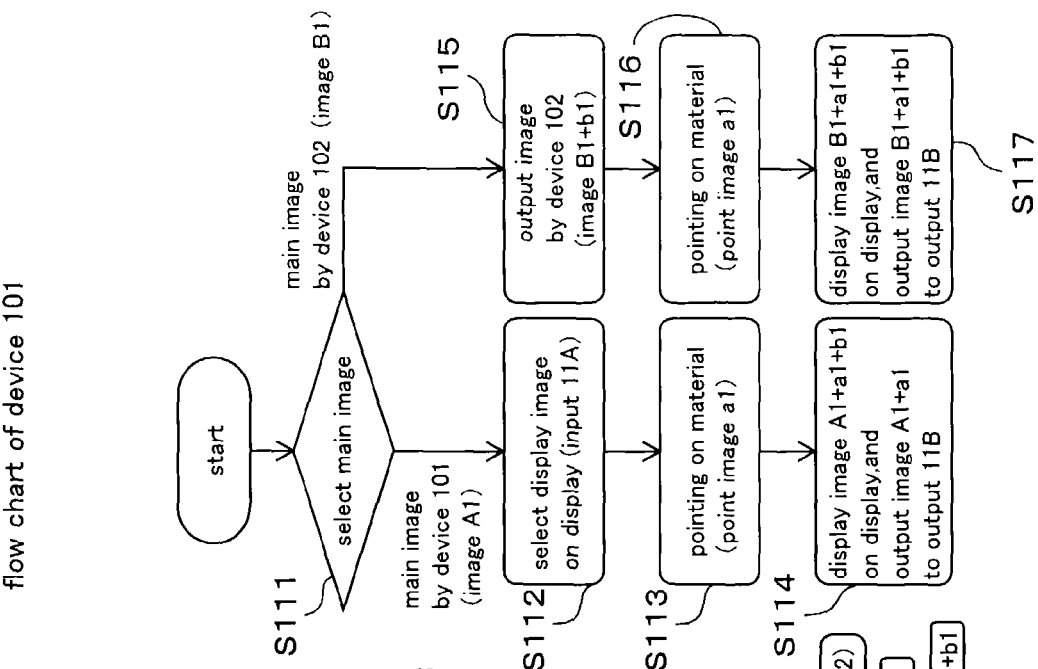
FIG. 3A is a functional block diagram of one material presentation device.

FIG. 3A is a functional block diagram showing the execution of an image synthesizing function using the device 101, and FIG. 4A is the same functional block diagram in the case of using the device 102. The figures facilitate understanding the processes for images which are input into and output from these devices, in "operation of material presentation device" as described below, although these devices have the same structure. Explanations for the execution of an image synthesizing function using the device 102 will be omitted.

The device 101 has an image synthesizing circuit (image synthesizing sections) 140 which synthesizes plural input images by an ordinary image synthesizing method. The image by the device 101 or the image output from the device 102 is input as the main image into the image synthesizing circuit 140. One image is selected as the main image of the device 101 from the camera image, the memory image and the external image, by a third selector 163. The main image is input into a first frame memory 151 via an input line 141, and is temporary stored therein. The image output from the device 102 is input from an input 11A into a second frame memory 152 via an input line 142, and is temporary stored therein. The image by the device 101 or the image output from the device 102 is selected by a first selector 161, and is input as the main image into the image synthesizing circuit 140. In this case, changing operations of setting the third selector 163 and of setting the first selector 161 are respectively performed by pressing one of the buttons 171 to 174 of the main image selecting section 170 on the above image selecting panel 116.

The additional image which is added to the main image is directly input from an input line 143 into the image synthesizing circuit 140, and a point image is directly input from a point image generating section (point image generating device) 145 thereinto. No image or one image is selected as the additional image, which is input from the input line 143 into the image synthesizing circuit 140, by a fourth selector 164. In this case, a changing operation of setting the fourth selector 164 is performed by pressing no button or one of the buttons 181 to 183 of the additional image selecting section 180 on the above image selecting panel 116. The point image is generated from point information, which is subtracted from the image photographed by the photographing section 113, by the point image generating, and the point image is directly input into the image synthesizing circuit 140. Generating a point image is described in "pointing function with a pen" hereinafter.

The additional image selected by the fourth selector 164 is synthesized with the main image, which is selected by the first selector 161, by the image synthesizing circuit 140. The point image is synthesized with the main image when the point image is generated by the point image generating section 145. The synthesized image is output from an output 11B to the device 102. Also, the synthesized image is input into a second selector 162. An image output from the device 102 is input from the second frame memory 152 into the second selector 162. The image output from the device 102 or the synthesized image is selected by the second selector 162, and is output to the display 114. In this case, a changing operation of setting the second selector 162 is performed by pressing one of the buttons 191 and 192 of the display image selecting section 190 on the above image selecting panel 116.

(B) Pointing Function with a Pen

In the case of the device 101, a pointing operation can be performed on a specific part of the material S1 on the material mounting pedestal 111 using the photographing section 113 and the pointing mark 121 of the pen 120 without the shadow of the pen 120 and the user's hand falling on a displaying screen. The action of the pointing function of the device 101 is described below. Explanations for the action of the pointing function of the device 102 will be omitted since the action thereof is the same as that of the device 101.

XY coordinates of a virtual screen are set within a photographing view angle of the camera 113a on the upper surface of the material mounting pedestal 111, that is, the material mounting surface, by an ordinary image analysis. A method of setting the virtual screen is described below. The pointing mark 121 of the pen 120 emits light in turn at two diagonal corner points at least within the photographing view angle of the camera 113a while the optical filter 113b is placed in the photographing optical path. The above state in which the pointing mark 121 of the pen 120 emits light is photographed by the camera 113a, and the positions of the pointing mark 121 which are light emitting points are recognized based on the image data by the camera 113a. The XY coordinates of the virtual screen are generated by an image processing technique. As a result, the invisible virtual screen is set on the material mounting pedestal 111, and is fixed as long as the interval between the camera 113a and the material mounting pedestal 111 is not changed. That is, the operation of setting the virtual screen may be performed once as an initial setting. When the material S1 is placed on the material mounting pedestal 111 and a pointing operation is performed thereon, the virtual screen is set within the overall photographing view angle, whereby it is possible to perform a pointing operation directly on the position of the material S1.

When the material S1 is placed on the material mounting pedestal 111, the virtual screen is set on the material S1. When a pointing operation is performed, the pointing mark 121 of the pen 120 emits light on the material S1 while the optical filter 113b is placed in the photographing optical path. As a result, the pointing mark 121 is photographed by the camera 113a, and the position coordinates of the pointing mark 121 on the coordinates of the virtual screen are sequentially calculated based on the image data. The point image which is in a shape of, for example, an arrow, is generated on the position coordinates of the pointing mark 121 which are calculated by the point image generating section 145. The point image is directly input into the image synthesizing circuit 140, and is synthesized with the main image which is input thereinto.

(C) Operation of Material Presentation Device

An example of operations of the above material presentation devices 101 and 102 is described hereinafter.

[Device 101]

Figure 3B:
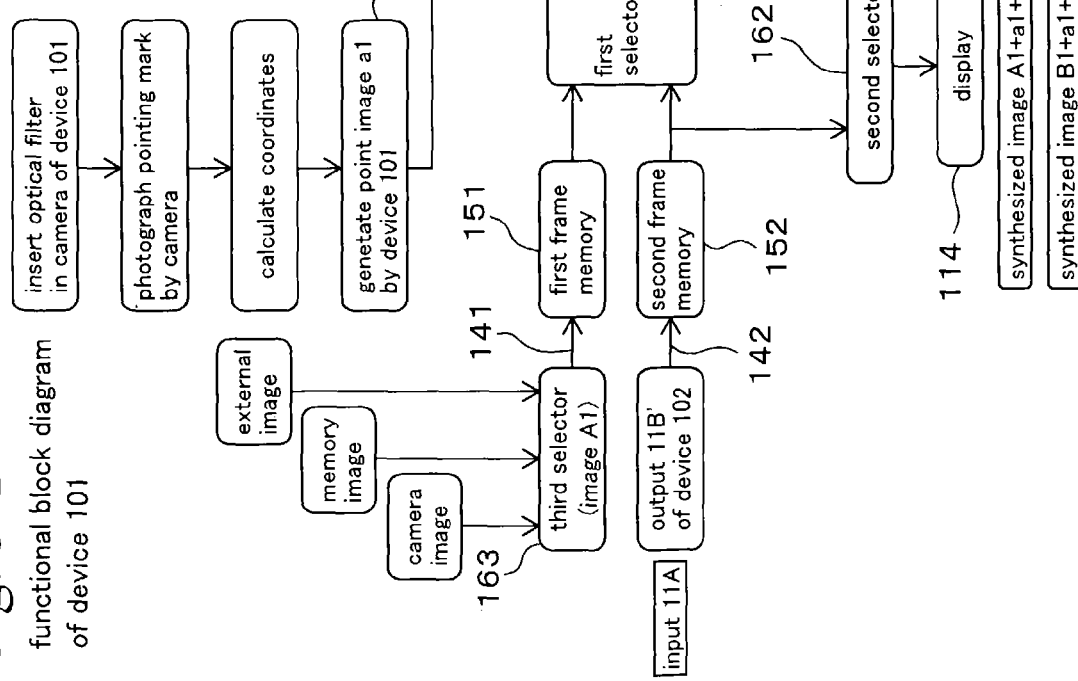
FIG. 3B is a flow chart showing an image synthesizing operation thereof in the first embodiment according to the present invention.

FIG. 3B is a flow chart showing the operation of the device 101. As shown in the figure, the image either by the device 101 or by the device 102 is selected as the main image by the device 101, and one image is selected as the main image from the above images when the image by the device 101 is selected as the main image (in step S111). In this case, an image A1 by the device 101 is selected as the main image, and one of the buttons 172 to 174 of the main image selecting section 170 on the above image selecting panel 116 is pressed. As a result, the image A1 which is set to be the main image on the part of the device 101 is input into the image synthesizing circuit 140.

Next, the input 11A button 191 of the display image selecting section 190 is pressed, the image output from the device 102 is selected as the image displayed on the display 114 (in step S 112). A pointing operation is performed on the material S1 of the device 101 using the pointing mark 121 of the pen 120 as described above (in step S113), whereby a point image a1 is input from the point image generating section 145 into the image synthesizing circuit 140. In this case, the additional image is not selected at all.

[Device 102]

As shown in a flow chart in FIG. 4B, in the case of the device 102, the image either by the device 101 or by the device 102 is selected as the main image which is shared with the devices 101 and 102 (in step S 121). In this case, since the image A1 by the device 101 is selected as the main image as described above, the input 11A' button 171' of the main image selecting section 170' on the image selecting panel 116' is pressed, whereby the image output from the device 101 is input as the main image of the device 102 into the image synthesizing circuit 140'.

Next, the synthesized image button 192' of the display image selecting section 190' is pressed, the synthesized image output from the image synthesizing circuit 140' is selected as the image displayed on the display 114'. In the case of the device 102, the additional image by the device 102 is not selected at all in the same manner as the device 101, and a pointing operation is performed using the pointing mark 121' of the pen 120' on the material S1' (in step S123), whereby a point image b1 is input from the point image generating section 145' into the image synthesizing circuit 140'.

By the above settings of the devices 101 and 102, the point image a1 is synthesized with the main image A1 by the image synthesizing circuit 140 of the device 101, the synthesized image A1+a1 is input from the output 11B into the input 11A' of the device 102 via the cable 130, and the synthesized image A1+a1 is displayed on the display 114' of the device 102 (in step S122 in FIG. 4B). While seeing the synthesized image A1+a1 on the display 114', the user of the device 102 performs a pointing operation on a desired part of the synthesized image A1+a1 using the pointing mark 121' (in step S123 in FIG. 4B). The synthesized image A1+a1 output from the device 101 is input from the input line 142' into the image synthesizing circuit 140' of the device 102, and the point image b1 is synthesized with the synthesized image A1+a1 by the image synthesizing circuit 140' thereof. The synthesized image A1+a1+b1 is displayed on the display 114' of the device 102, is input from the output 11B' into the input 11A of the device 101 via the cable 130, and is also displayed on the display 114 of the device 101 (in step S114 in FIG. 3B and in step S124 in FIG. 4B). The synthesized image A1+a1+b1 which is displayed on the displays 114 and 114' is shared with the users of device 101 and 102.

Next, when an image B1 by the device 102 is selected as the main image, image synthesizing operations proceed in the above manner as shown in steps S115 to S 117 in FIG. 3B and in steps S125 to S127 in FIG. 4B.

Figure 5:
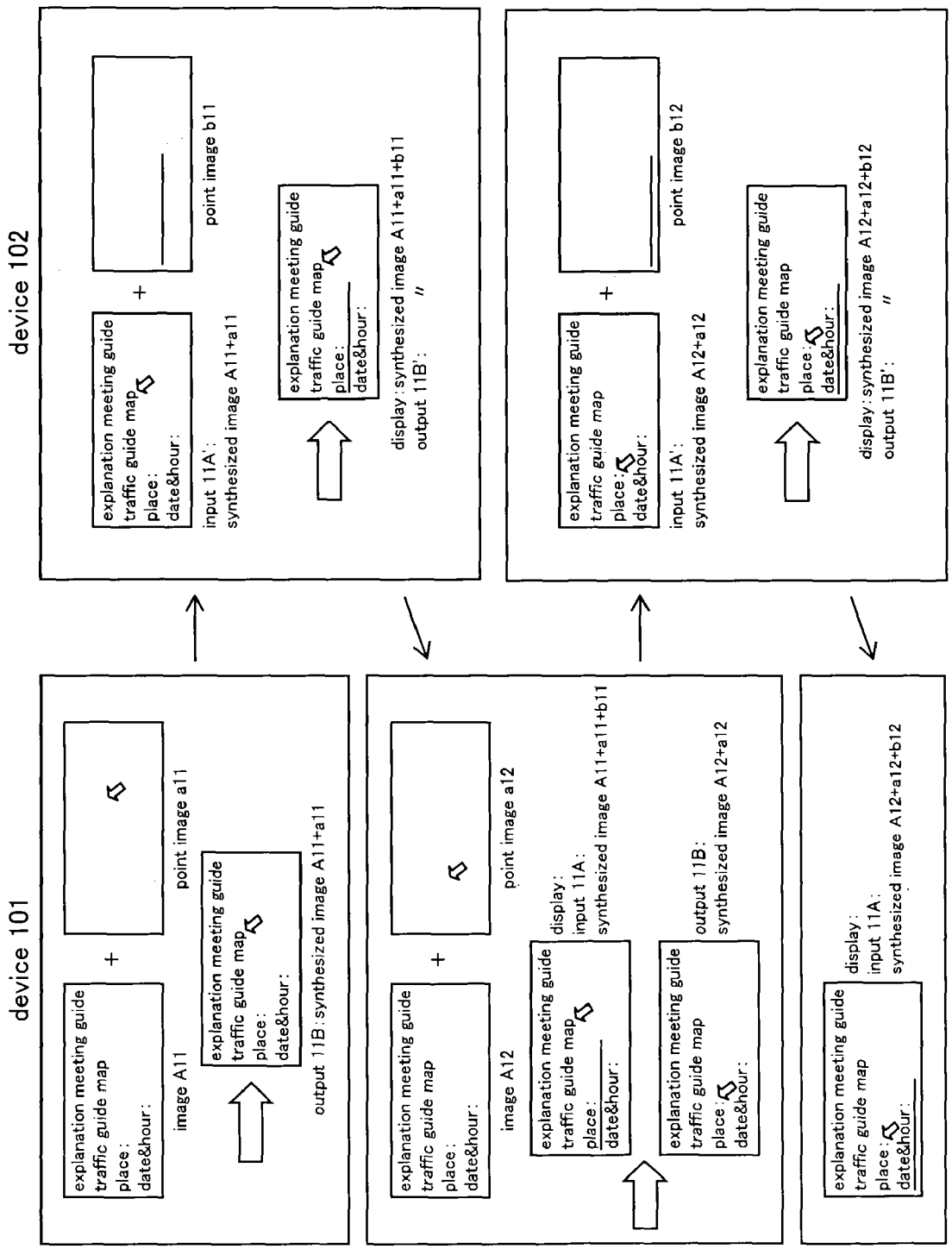
FIG. 5 is a flow chart of an image, showing an image synthesizing process in the first embodiment according to the present invention.

FIG. 5 shows the above operations of image synthesizing in time sequence in turn, which are divided between parts of the devices 101 and 102. A main image A11, a point image a11 (arrow), and a point image b11 (underline) respectively correspond to the main image A1, the point image a1, and the point image b1. FIG. 5 shows operations in which a pointing operation is performed on a part of the main image A12 again using the device 101, the point image a12 is thereby synthesized with the main image A12, and the synthesized image A12+a12 is output to the device 102. A pointing operation is performed on a part of the synthesized image A12+a12 again using the device 102, the point image b12 is thereby synthesized with the synthesized image A12+a12, and the synthesized image A12+a12+b12 is displayed on the displays 114 and 114' of the devices 101 and 102. As a result, it is possible to add the point image to the synthesized image which is output to the displays 114 and 114' of the devices 101 and 102 and is shared with the devices 101 and 102. In this case, it is possible to communicate using speaker-microphones 115 and 115' whenever necessary.

Figure 6:
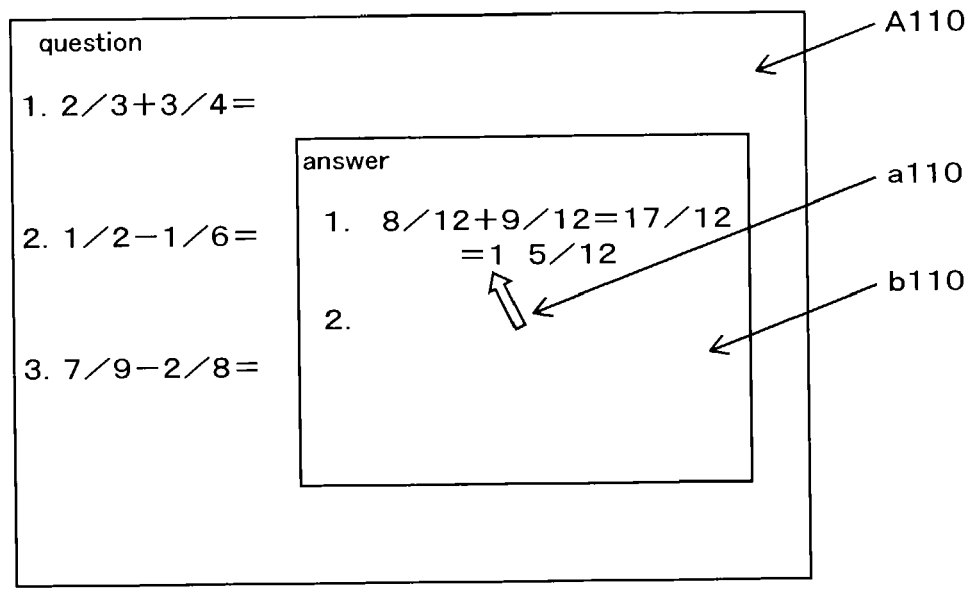
FIG. 6 is a diagram of one example of a synthesized image in a case of using the material presentation device in an educational presentation in the first embodiment according to the present invention.

FIG. 6 shows a case in which the above operations are used in an educational presentation in which a teacher teaches arithmetic problems to students. In this case, an additional image b110 which is selected by the device 102 is synthesized with a main image A110 by the device 101, the synthesized image A110+b110 is input into the device 101, a point image a110 is synthesized with the synthesized image A110+b110, and the synthesized image A110+b110+a110 is displayed on the displays 114 and 114' of the devices 101 and 102.

Figure 7:
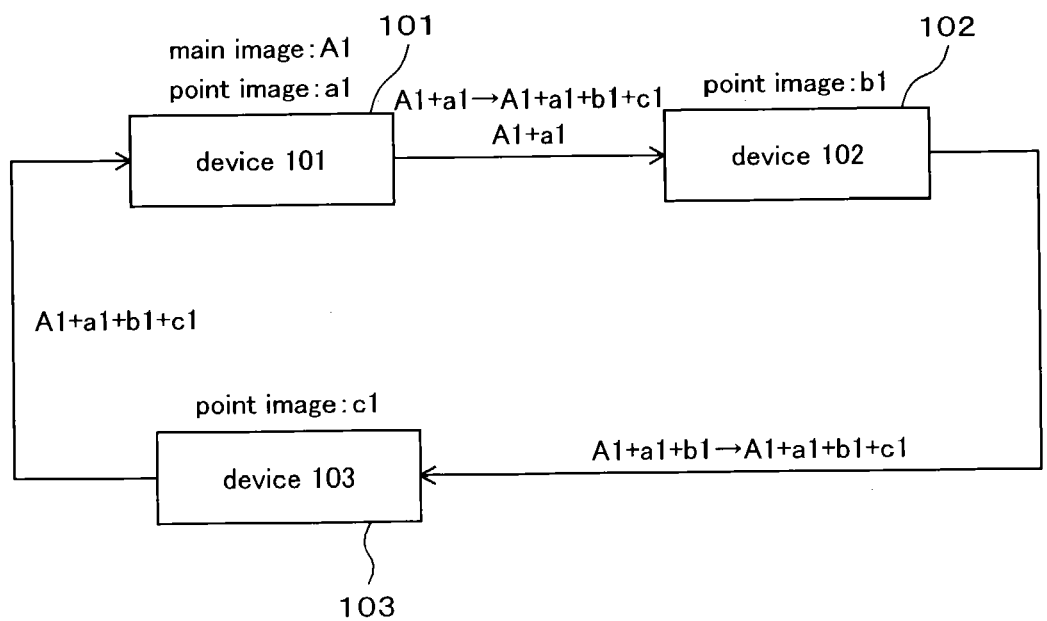
FIG. 7 is a diagram showing a state in which three material presentation devices are connected to each other in the first embodiment according to the present invention.

FIG. 7 shows a case in which three material presentation devices, that is, the device 101, the device 102, and a device 103 are connected in a daisy chain and the synthesized image is shared among the devices 101 to 103 while a point image is synthesized with a main image in turn of the device 101, device 102, and the device 103. The device 103 has the substantially same structure as that of the device 101, and reference numerals of the components in the device 103 are attached with an affix """" to the reference numerals of the components in the device 101. Since the components in the device 103 are identical to those of the device 101, detailed explanations for the components in the device 103 will be omitted. The outputs 11B and 12B of the device 101 are respectively connected to the inputs 11A' and 12A' of the device 102 next thereto, the outputs 11B' and 12B' of the device 102 are respectively connected to the inputs 11A" and 12A" of the device 103 next thereto, and the outputs 11B" and 12B" of the device 103 are respectively connected to the inputs 11A and 12A of the device 101 next thereto, whereby the main image and the point image are transmitted so as to be circulated in a one-way path. FIG. 7 shows a case of exchanging the images described below. An image A1 which is stored in the device 101 is set as the main image of the devices 101 to 103. Next, a pointing operation is performed using the device 101, whereby a point image a1 is synthesized with the main image A1, and the synthesized image A1+a1 is output to the devices 102 and 103. The input 11A button 171 of the image selecting section 170 is pressed in order to input the synthesized image into the device 101 itself. A point image b1 is synthesized with the synthesized image A1+a1 by the device 102, and the synthesized image A1+a1+b1 is transmitted to the devices 103 and 101. Next, a point image c1 is synthesized with the synthesized image A1+a1+b1, and the synthesized image A1+a1+b1+c1 is transmitted to the devices 101 and 102. The synthesized image A1+a1+b1+c1 is thereby shared with the devices 101 to 103.

According to the material presentation device in the first embodiment, plural users can add additional images to the main image, exchange and share the synthesized images among each other, and simultaneously communicate with each other based on the shared images so that it is not necessary to use conventional external image processing devices. In addition, the material presentation device itself has a synthesized image displaying function, whereby conventional image processing devices are not necessary, a structure of the material presentation device for sharing an image can be designed simply, and setting for communicating an image with each other can be performed by an easy operation of buttons.

(2) Second Embodiment (A) Constitution of Material Presentation Device

Figure 8:
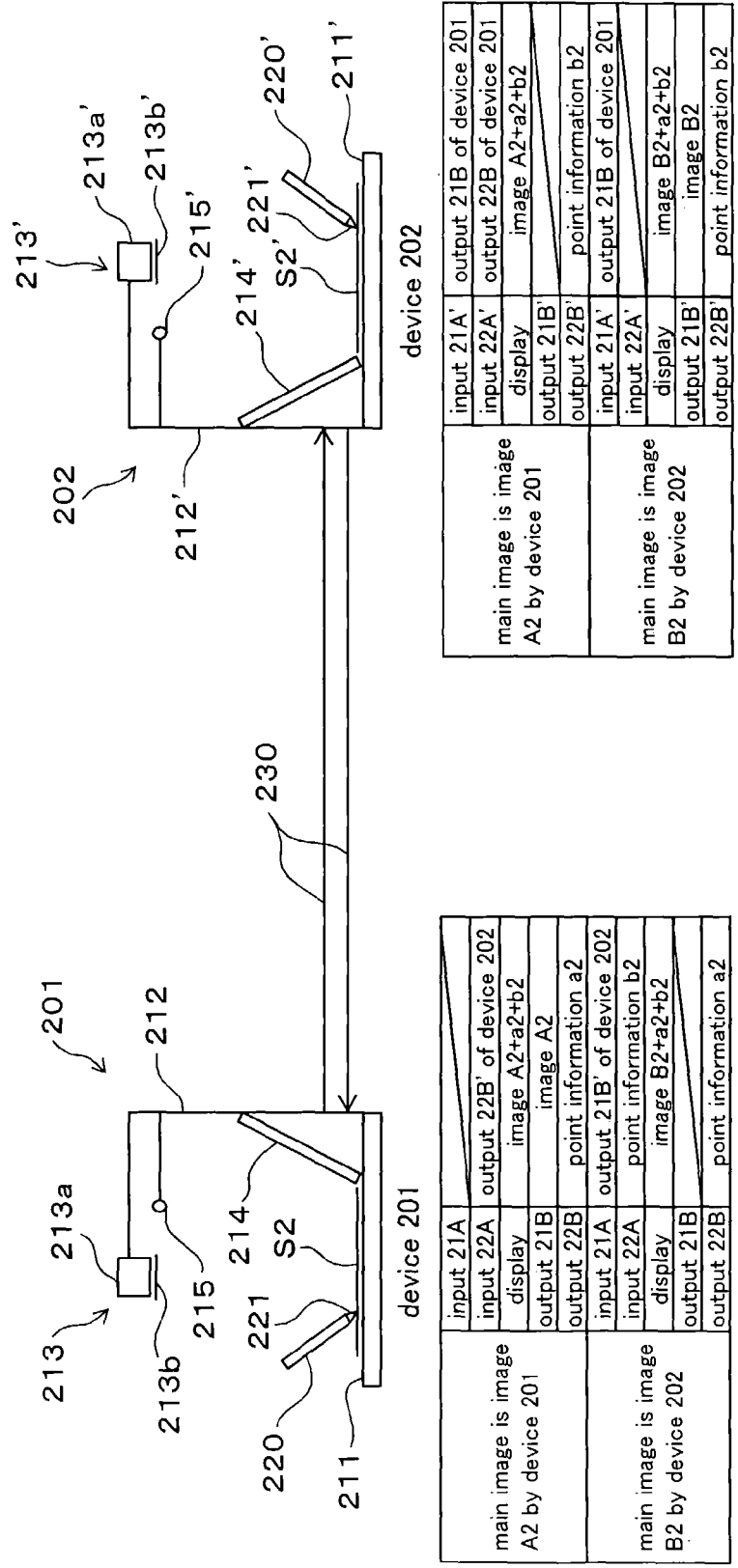
FIG. 8 is a schematic diagram showing a state in which image data and voice data are communicated using two material presentation devices in the second embodiment according to the present invention.

FIG. 8 systematically shows a state in which image data and voice data are communicated with each other by material presentation devices 201 and 202 (hereinafter these material presentation devices are called devices 201 and 202 for short) in a second embodiment according to the present invention. The devices 201 and 202 have the substantially same structure, and reference numerals of the components in the device 202 are attached with an affix "'" to the reference numerals of the components in the device 201. Since the components in the device 202 are identical to those of the device 201, detailed explanations for the components in the device 202 will be omitted. The device 201 is equipped with a material mounting pedestal 211, a photographing section 213, provided on the material mounting pedestal 211 via an arm 212, which photographs a material S2, for example, a document on the material mounting pedestal 211, a display (image displaying section) 214, and a speaker-microphone 215 which inputs and outputs voice. The display 214 is provided at the back side of the set position of the material on the material mounting pedestal 211, and is set at a backward inclined attitude toward an user (not shown) who is in front of the material mounting pedestal 211.

The photographing section 213 is equipped with a camera 213a and an optical filter 213b which enables the camera 213a to photograph only infrared light. The optical filter 213b is removably placed in the photographing optical path of the camera 213a. The optical filter 213b is switched between a state of being placed in the photographing optical path and a state of being removed therefrom by hand or by automatic control. In the state of being removed therefrom, the camera 213a photographs the material S2, and the photographed image by the camera 213a is displayed on the display 214.

An operation of reading pointing information is described hereinafter. In FIG. 8, reference numeral 220 denotes a pen which is used to indicate, for example, a specific part of the material S2 by the user. A pointing mark 221 is provided at the leading tip portion of the pen 220 which emits infrared light. The pointing mark 221 is composed of a light emitting diode (LED) which emits light by changing a switch to ON. The user performs a pointing operation on a required part with the pointing mark 221 of the pen 220.

An image which is displayed on the respective displays 214 and 214' of the devices 201 and 202 is input into and output to each other, and the same image is displayed on the displays 214 and 214'. That is, the same image is shared with the devices 201 and 202. The voice data which are input into the speaker-microphones 215 and 215' are input into and output to each other, and the voice data which are input into speaker-microphone 215 of the device 201 are output from the speaker-microphone 215' of the device 202. A mutual communicating device for images and voices are selected appropriately according to the set positions of the devices 201 and 202 or interfaces, and is composed of a cable 230 for communication in FIG. 8. As shown in the tables below schematic diagram of the device 201 in FIG. 8, the device 201 has an input 21A (first input section) and an output 21B (first output section) for changing a main image with the device 202, and has an input 22A (second input section) and an output 22B (second output section) for changing point information with the device 202. The input 21A is connected to the output 21B' of the device 202, and the input 22A is connected to the output 22B' of the device 202.

The above devices 201 and 202 enable communicating using speaker-microphones 215 and 215' while sharing an image displayed on the respective displays 214 and 214', enable synthesizing of a point image as an additional image with a main image, and enable sharing of the synthesized image each time.

The main image is shared with the respective devices 201 and 202. On the part of the device 201, a camera image (an object of the camera image is the material S2, etc.) which is photographed by the camera 213a is selected as the main image. A memory image is stored in an internal memory device which is provided in the device 201 or in an external memory device which is removably placed in the device 201. An external image which is generated from an external device, for example a personal computer, connected to device 201 is selected as the main image. An image by the device 202, which is input from the output 21B' of the device 202 into the input 21A of the device 201, is selected as the main image. This image by the device 202 is one of the camera image, the memory image and the external image, which are stored in the device 202.

Figure 9:
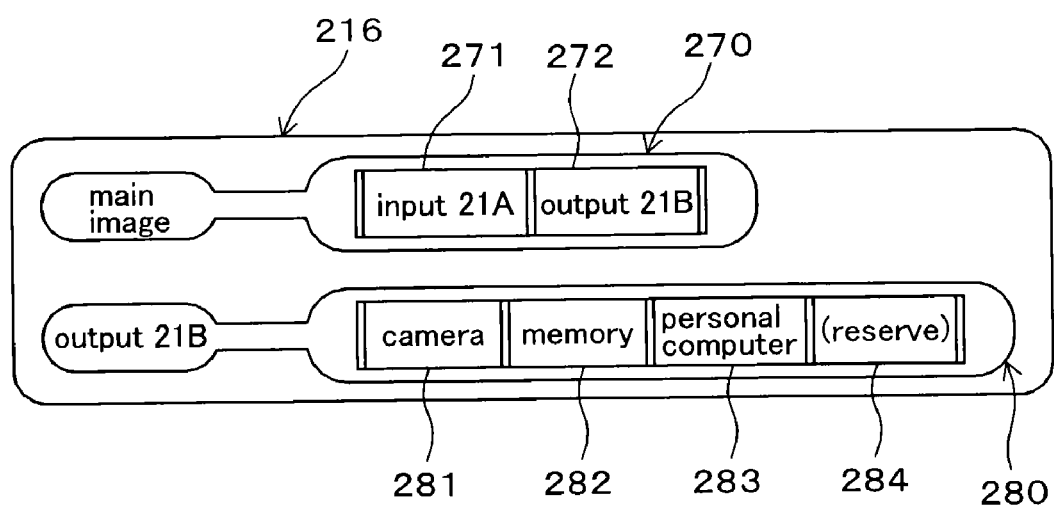
FIG. 9 is an image selecting panel which is provided on the material presentation device in the second embodiment according to the present invention.

As shown in FIG. 9, an image selecting panel 216 is provided on the device 201. The image selecting panel 216 is equipped with a main image selecting section 270 and an output image selecting section 280. The main image selecting section 270 has buttons for selecting one image either by the device 201 or by the device 202 as the main image. The output image selecting section 280 has buttons for selecting one image as the main image from the above images when one image by the device 201 is selected as the main image, that is, which of the above images is selected as the output image from the output 21B of the device 201.

The main image selecting section 270 has an input 21A button 271 for selecting an image, which is input from the device 202 into the device 201, as the main image, and an output 21B button 272 for selecting an image by the device 201 as the main image and outputting the main image from the output 21B to the device 202. The output image selecting section 280 has a camera button 281 for selecting the camera image by the device 201, a memory button 282 for selecting the memory image of the device 201, a personal computer button 283 for selecting the external image which is input from the external device (in this case, a personal computer) connected to the device 201, and a reserve button 284 for selecting one image other than these images.

Figure 10A:
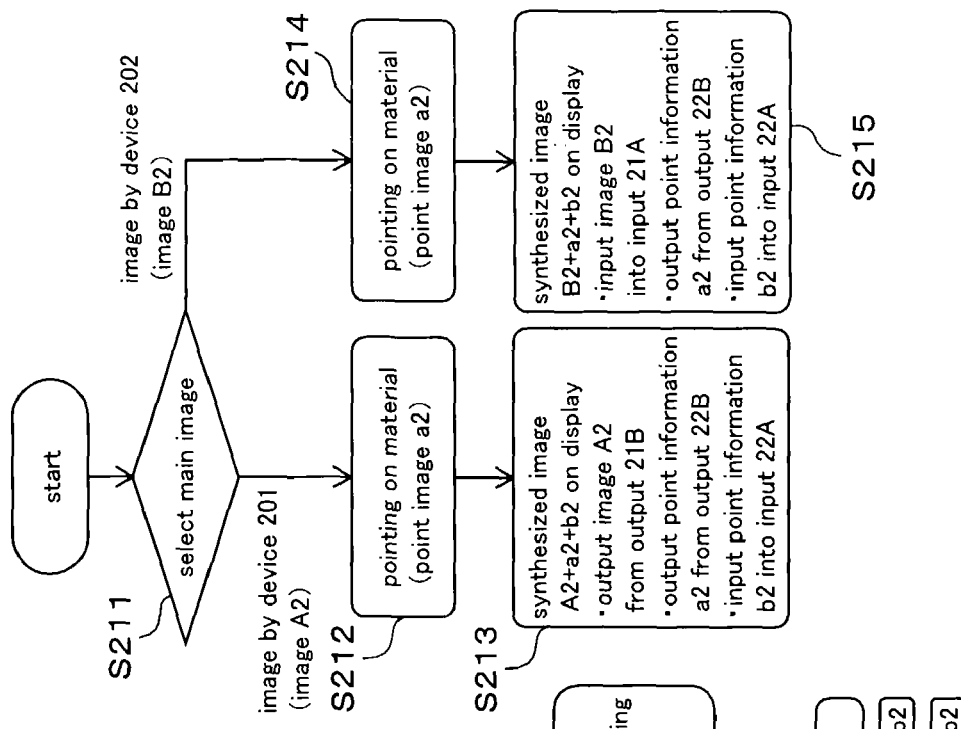
FIG. 10A is a functional block diagram of one material presentation device.
Figure 11B:
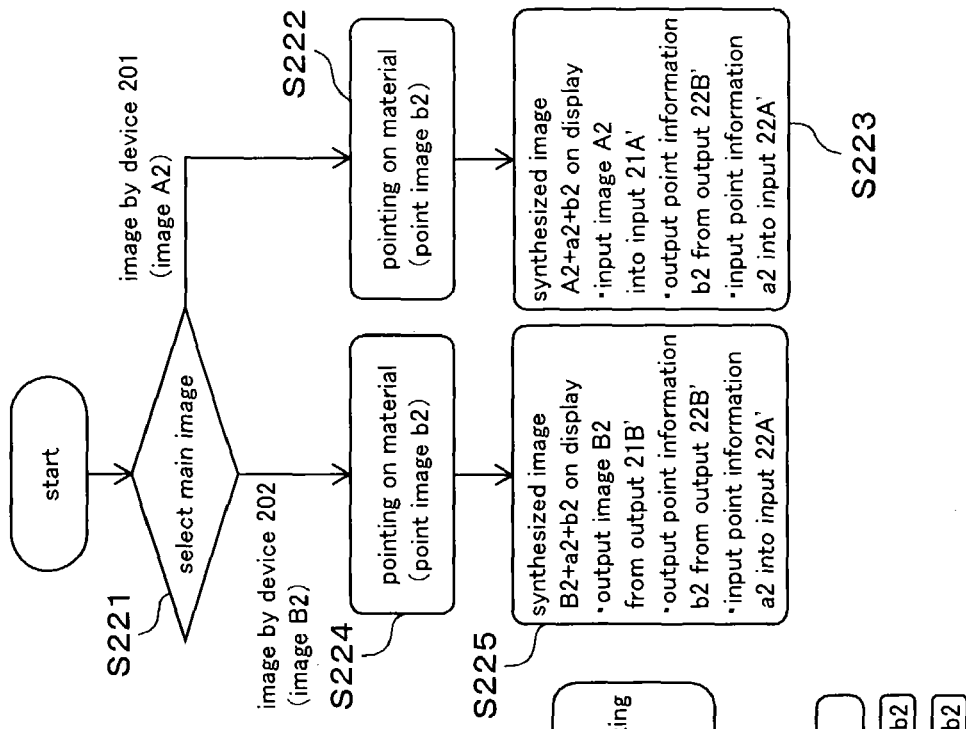
FIG. 11B is a flow chart showing an image synthesizing operation thereof in the second embodiment according to the present invention.
Figure 11A:
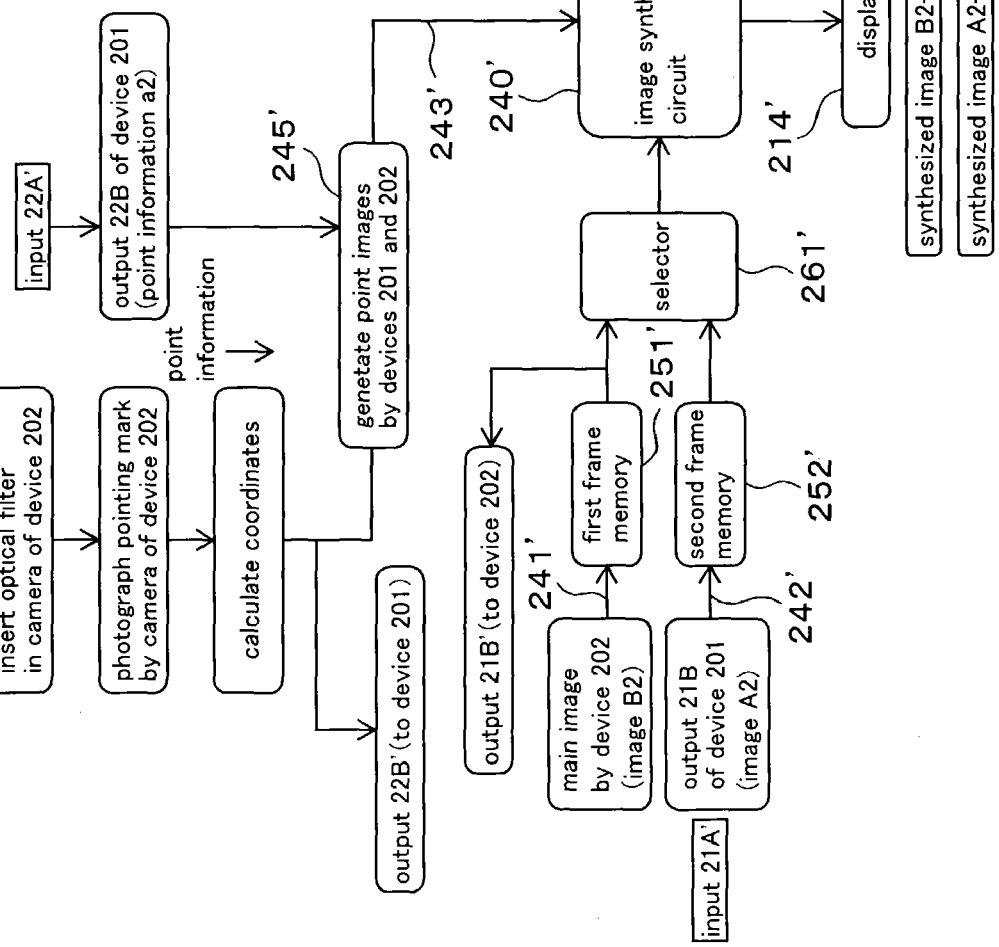
FIG. 11A is a functional block diagram of the other material presentation device.

FIG. 10A is a functional block diagram showing the execution of an image synthesizing function using the device 201, and FIG. 11A is the same functional block diagram in the case of using the device 202. The figures facilitate understanding of the processes for images, which are input into and output to these devices, in "operation of material presentation device" described below, although these devices have the same structure. Explanations for the execution of an image synthesizing function using the device 202 will be omitted.

The device 201 has an image synthesizing circuit (image synthesizing section) 240 which synthesizes plural input images by an ordinary image synthesizing method. The image by the device 201 or the image output from the device 202 is input as the main image into the image synthesizing circuit 240. One image is selected as the main image of the device 201 from the camera image, the memory image and the external image. The main image is input into a first frame memory 251 via an input line 241, and is temporary stored therein. The image output from the device 202 is input from the input 21A into a second frame memory 252 via an input line 242, and is temporary stored therein. The image by the device 201 or the image output from the device 202 is selected by a selector 261, and is input as the main image into the image synthesizing circuit 240. When the image by the device 201 is selected as the main image by the selector 261, the main image is output from the first frame memory 251 to the input 21A' of the device 202 via the output 21B. In this case, a changing operation of setting the selector 261 is performed by pressing either the input 21A button 271 or the output 21B button 272 of the main image selecting section 270 on the above image selecting panel 216.

The point information related to the point image which is added to the main image is input from the output 22B' of the device 202 into the input 22A, and the point information is input into a point image generating section (point image generating device) 245. The point information of the device 201 is also input into the point image generating section 245. The point information of the device 201 is output from the output 22B to the input 22A' of the device 202. The point image is generated by the point image generating section 245 based on the input point information. The point image generated thereby is input from an input line 243 into the image synthesizing circuit 240.

As described above, the main image is communicated in the communication system of the inputs 21A and 21A'/outputs 21B and 21B' of the devices 201 and 202, and the point information related to the point image which is added to the main image is communicated in the communication system of the inputs 22A and 22A'/outputs 22B and 22B' thereof. In this case, the point information which is communicated in the communication system of the inputs 22A and 22A'/outputs 22B and 22B' is image information which is needed to generate the point image. The point information input into the point image generating section 245 is described below.

(a) Function information: for example, a function of a pointer which indicates a specific part, a function for drawing lines by connecting loci of the pointer, and a function for eliminating a specific part.

(b) Detail information: for example, a shape of a pointer which corresponds to the function.

(c) Color information: for example, a color of a point image.

(d) Position information: for example, a position of an indication mark based on X coordinates and Y coordinates.

In addition, transmitting class information other than the above point information, for example, announcement information of transmitting the main image, a designation of a device of transmitting destination (transmitting destination is the device 201 or the device 202, or both of them), and a designation of the device of transmitting master (device 201 or device 202), is transmitted in the communication system of the inputs 22A and 22A'/outputs 22B and 22B'.

In order to generate the point image by the point image generating section 245, for example, memory devices are prepared for the device 201 and the device 202 respectively, and a point image is generated by the memory device which is selected. In addition, instead of using the above memory devices, it is possible to store point information of the both devices and generate a point image The point image generated by the point image generating section 245 is synthesized with the main image, which is selected by the selector 261, (either the image by the device 201 or the image which is input from the output 21B' of the device 202 into the input 21A of the device 201), by the image synthesizing circuit 240, and the synthesized image is displayed on the displays 214 and 214'. The synthesized image thereby is shared by the users of the devices 201 and 202.

(B) Pointing Function with a Pen

A pointing operation can be performed on a specific part of the material S2 on the material mounting pedestal 211 using the photographing section 213 and the pointing mark 221 of the pen 220 without the shadow of the pen 220 and the user's hand falling on a displaying screen. The pointing function is described below. Explanations for the action of the pointing function of the device 202 will be omitted since the action of the pointing function of the device 202 is the same as that of the device 201.

XY coordinates of a virtual screen are set within a photographing view angle of the camera 213a on the upper surface of the material mounting pedestal 211, that is, the material mounting surface by an ordinary image analysis. A method of setting the virtual screen is described below. The pointing mark 221 of the pen 220 emits light in turn at two diagonal corner points at least within the photographing view angle of the camera 213a while the optical filter 213b is placed in the photographing optical path. The above state in which the pointing mark 221 of the pen 220 emits light is photographed by the camera 213a and the positions of the pointing mark 221 which are light emitting points are recognized based on the image data by the camera 213a. The XY coordinates of the virtual screen are generated by an image processing technique. As a result, the invisible virtual screen is set on the material mounting pedestal 211, and is fixed as long as the interval between the camera 213a and the material mounting pedestal 211 is not changed. That is, the operation of setting the virtual screen may be performed once as an initial setting. When the material S2 is placed on the material mounting pedestal 211 and the pointing operation is performed thereon, the virtual screen is set within the overall photographing view angle, whereby it is possible to perform the pointing operation directly on the position of the material S2.

When the material S2 is placed on the material mounting pedestal 211, the virtual screen is set on the material S2. When the pointing operation is performed, the pointing mark 221 of the pen 220 emits light on the material S2 while the optical filter 213b is placed in the photographing optical path. As a result, the pointing mark 221 is photographed by the camera 213a, and the position coordinates of the pointing mark 221 on the coordinates of the virtual screen are sequentially calculated based on the image data. The point image which is in a shape of, for example, an arrow, is generated on the position coordinates of the pointing mark 221 which are calculated by the point image generating section 245.

(C) Operation of Material Presentation Device

An example of operations of the above material presentation devices 201 and 202 is described hereinafter.

Figure 10B:
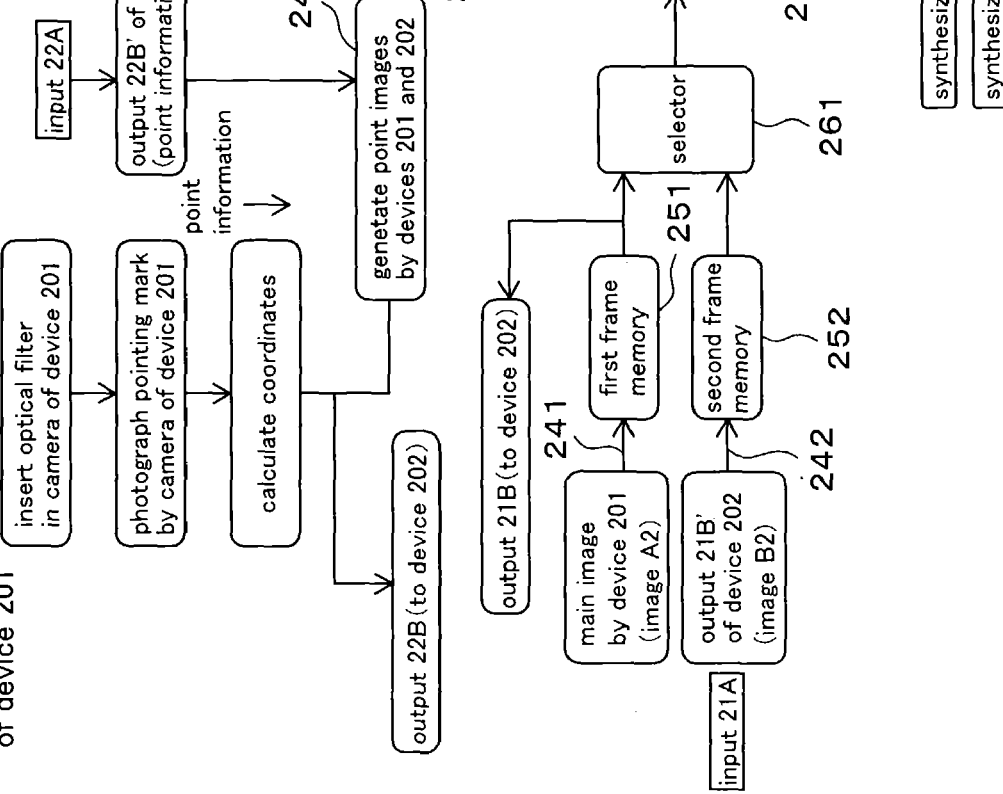
FIG. 10B is a flow chart showing an image synthesizing operation thereof in the second embodiment according to the present invention.

FIG. 10B is a flow chart showing operations of the device 201. As shown in the figure, the image either by the device 201 or by the device 202 is selected as the main image by the device 201, and one image is selected as the main image from the above images when the image by the device 201 is selected as the main image (in step S211). In this case, an image A2 by the device 201 is selected as the main image, and the output 21B button 272 of the main image selecting section 270 on the above image selecting panel 216 and one of the buttons 281 to 283 of the output image selecting section 280 are pressed. As a result, the image A2 which is set to be the main image of the device 201 is input into the image synthesizing circuit 240, and is also input from the output 21B into the input 21A' of the device 202. The image A2 which is input into the image synthesizing circuit 240 is displayed on the display 214 of the device 201. One example of the image A2 is shown in the upper left side of the flow chart of the device 201 in FIG. 12.

As shown in a flow chart in FIG. 11B, in the case of the device 202, the image either by the device 201 or by the device 202 is selected as the main image which is shared with the devices 201 and 202 (in step S221). In this case, since the image A2 by the device 201 is selected as the main image as described above, the input 21A' button 271' of the main image selecting section 270' on the image selecting panel 216' is pressed, whereby the image A2, which is output from the output 21B of the device 201, is input into the input 21A' of the device 202, is input into the image synthesizing circuit 240', and is displayed on the display 214'.

On the part of the device 201, a pointing operation is performed using the pointing mark 221 of the pen 220 on the material S2 as described above (in step S212), whereby point information of a point image a2 (shown in the upper center of the flow chart of the device 201 in FIG. 12) is input from the output 22B of the device 201 into the input 22A' of the device 202, and is input into the point image generating section 245. The point image a2 based on the point information is generated by the point image generating section 245, and the point image a2 is input into the image synthesizing circuit 240 and is synthesized with the image A2 thereby. The synthesized image A2+a2 which is synthesized thereby is output to the display 214, and is displayed on the display 214 (shown in the upper right side of the flow chart of the device 201 in FIG. 12). On the other hand, on a part of the device 202, the point image a2 is generated by the point image generating section 245', based on the point information which is input from the device 201 into the input 22A' (shown in the upper center of the flow chart of the device 202 in FIG. 12). The point image a2 is synthesized with the image A2 by the image synthesizing circuit 240', and the synthesized image A2+a2 is displayed on the display 214' (shown in the upper right side of the flow chart of the device 202 in FIG. 12). As a result, the synthesized image A2+a2 is displayed on both displays 214 and 214' of the devices 201 and 202.

While seeing the synthesized image A2+a2 on the display 214', the user of the device 202 performs a pointing operation on a desired part of the synthesized image A2+a2 using the pointing mark 211' (in step S222). Point information of a point image b2 (shown in the lower left side of the flow chart of the device 202 in FIG. 12) is output from the output 22B' to the input 22A of the device 201, and is input into the point image generating section 245' of the device 202. On the part of the device 202, the point image b2 based on the point information is generated by the point image generating section 245', and the point image b2 is input into the image synthesizing circuit 240'. The point image b2 is synthesized with the image A2+a2 thereby. The synthesized image A2+a2+b2 is displayed on the display 214' (in step S223: shown in the lower right side of the flow chart of the device 202 in FIG. 12).

On the other hand, on the part of the device 201, the point information of a point image b2 is input from the device 202 into the input 22A, and the point image b2 is generated by the point image generating section 245 based on the point information (shown in the lower left side of the flow chart of the device 201 in FIG. 12). The point image b2 is input into the image synthesizing circuit 240, is synthesized with the synthesized image A2+a2 thereby, and the synthesized image A2+a2+b2 is displayed on the display 214 (in step S213: shown in the lower right side of the flow chart of the device 202 in FIG. 12). As a result, the synthesized image A2+a2+b2 displayed on both displays 214 and 214' of the devices 201 and 202 is shared by the users of the devices 201 and 202.

Next, when an image B2 by the device 202 is selected as the main image, image synthesizing operations proceed in the above manner as shown in steps S214 and S 215 in FIG. 10B and in steps S224 and S225 in FIG. 11B.

As described above, it is possible to add the point image to the synthesized image (at first, the main image) which is output to the displays 214 and 214' of the devices 201 and 202 and is shared thereby. In this case, it is possible to communicate using speaker-microphones 215 and 215' whenever necessary.

Figure 13:
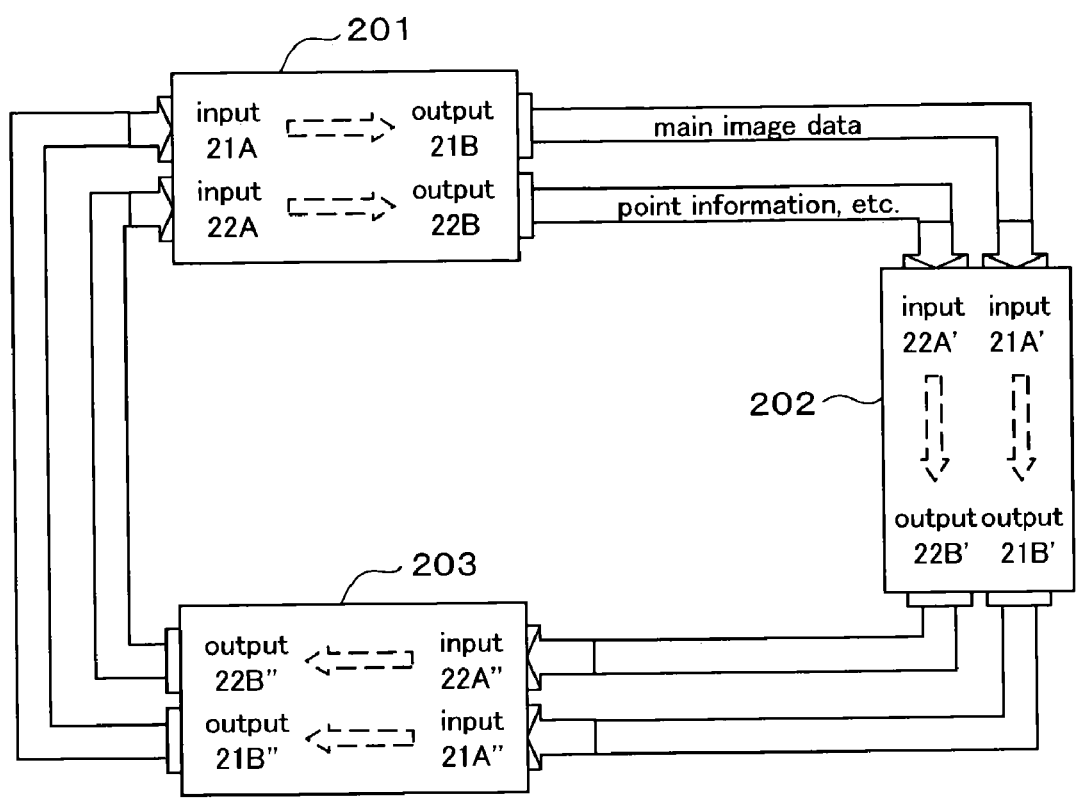
FIG. 13 is a diagram showing a state in which three material presentation devices are connected to each other in the second embodiment according to the present invention.

FIG. 13 shows a case in which three material presentation devices, that is, the device 201, the device 202 and a device 203 are connected in a daisy chain and the synthesized image is shared thereby. The device 203 has the substantially same structure as that of the device 201, and reference numerals of the components in the device 203 are attached with an affix """ to the reference numerals of the components in the device 201. Since the components in the device 203 are identical to those of the device 201, detailed explanations for the components in the device 203 will be omitted. The outputs 21B and 22B of the device 201 are respectively connected to the inputs 21A' and 22A' of the device 202 next thereto, the outputs 21B' and 22B' of the device 202 are respectively connected to the inputs 21A" and 22A" of the device 203 next thereto, and the outputs 21B" and 22B" of the device 203 are respectively connected to the inputs 21A and 22A of the device 201 next thereto, whereby the main image and the point image are transmitted so as to be circulated in a one-way path. A case in which an image which is stored by the device 201 is transmitted as the main image from the device 201 to the devices 202 and 203 and the point images by the devices 201 to 203 are added to the main image, is described below.

The device 201 transmits the announcement information of transmitting the main image, from the output 22B to the device 202, and waits for the acceptance information which is transmitted from the devices 202 and 203. The device 202 transmits the announcement information, which is transmitted from the device 201, as it is from the output 22B' to the device 203, and transmits the acceptance information thereof from the output 22B' to the device 203. The device 203 transmits the announcement information, which is transmitted from the device 202, as it is from the output 22B" to the device 201, and transmits the acceptance information, which is transmitted from the devices 202 and 203, from the output 22B" to the device 201. The device 201 accepts the acceptance information from the devices 202 and 203, and transmits the main image from the output 21B to the device 202. The main image is transmitted to the devices 202 and 203, and is displayed on the displays 214 to 214" of the devices 201 to 203. In this state, pointing operations are performed appropriately using the devices 201 to 203, the point information of the point images is transmitted in the communication system of the inputs 22A to 22A"/outputs 22B to 22B" as described below.

The device 201 generates a point image based on point information, which is input into the input 22A, (point information transmitted from the device 202 and/or the device 203) and point information of the device 201 itself, synthesizes the point image with the main image, and displays the synthesized image on the display 214. The device 201 does not output an image which is input from the input 21A, and does not output point information which is input from the input 22A when the point information is one which is transmitted from the device 201 itself.

The device 202 generates a point image based on point information, which is input into the input 22A', (point information transmitted from the device 201 and/or the device 203) and point information of the device 202 itself, synthesizes the point image with the main image, and displays synthesized image on the display 214'. The device 202 does not output an image which is input from the input 21A', and does not output point information which is input from the input 22A' when the point information is one which is transmitted from the device 202 itself.

The device 203 generates a point image based on point information, which is input into the input 22A", (point information transmitted from the device 201 and/or the device 202) and point information of the device 203 itself, synthesizes the point image with the main image, and displays synthesized image on the display 214". The device 203 does not output an image which is input from the input 21A", and does not output point information which is input from the input 22A" when the point information is one which is transmitted from the device 203 itself.

According to the material presentation device in the second embodiment, plural users can add point images to the main image and share the synthesized image with each other so that it is not necessary to use the conventional external image processing devices. Thus, a structure of the material presentation device for sharing an image can be designed simply, and setting operations for communicating images with each other can be performed by an easy operation of buttons.

In addition, instead of outputting the synthesized image to another material presentation device, the point information which is needed to generate the point image is output, the point image is generated by the point image generating section 245 of another material presentation device into which the point information is input, and is synthesized with the main image by the image synthesizing circuit 240 thereof. Thus, transmitted point information is much less than image data in information content and in capacity thereof, whereby communication traffic is greatly reduced. As a result, it is possible to reduce the time in communicating and displaying images, and to make image displaying actions smoother. Furthermore, as shown in FIG. 13, it is easy to connect three or more material presentation devices, and to communicate with each other while sharing images widely.

What is claimed is:

1. A material presentation device connecting at least two material presentation devices to each other, comprising:
    a material mounting pedestal having a material mounting surface on which material is mounted;
    a photographing section for photographing the material;
    a first selecting device for selecting one image as a main image from plural images composed of an image output by another material presentation device, a camera image of a material on the material mounting pedestal, which is photographed by the photographing section, an image stored in a memory device, and an external image output by an external device connected thereto;
    a second selecting device capable of selecting no image or one image as an additional image from plural images composed of a camera image of a material on the material mounting pedestal, which is photographed by the photographing section, an image stored in the memory device and an external image output by the external device;
    a virtual screen which is set on the material mounting surface;
    a pointing mark for setting the virtual screen and for being used by a user to operate a point on the virtual screen;
    a point image generating device for generating a point image from point information which is subtracted from an image of the virtual screen and the pointing mark photographed by the photographing section;
    an image synthesizing section for synthesizing the additional image selected by the second selecting device and the point image with the main image selected by the first selecting device;
    a display image selecting device for selecting one image from an image output by another material presentation device and the image synthesized by the image synthesizing section;
    an image displaying section for displaying the image selected by the display image selecting device;
    an image outputting section for outputting the image synthesized by the image synthesizing section; and
    an optical filter which is removably provided to the photographing section and which enables the photographing section to photograph only light emitted from the pointing mark,
    wherein when the user sets two arbitrary reference points by using the pointing mark on the material mounting surface, the photographing section photographs the two reference points, and coordinates on the virtual screen are generated by an image processing technique from a photographed image of the two arbitrary reference points photographed by the photographing section, so that the virtual screen is set to have a rectangular area based on the two arbitrary reference points.

2. A material presentation device connecting at least two material presentation devices to each other, comprising:
- a material mounting pedestal having a material mounting surface on which material is mounted;
- a photographing section for photographing the material;
- a selecting device for selecting one image as a main image from plural images composed of an image output by another material presentation device, a camera image of a material on the material mounting pedestal, which is photographed by the photographing section, an image stored in a memory device, and an external image output by an external device connected thereto;
- a virtual screen which is set on the material mounting surface;
- a pointing mark for setting the virtual screen and for being used by a user to operate a point on the virtual screen;
- a point image generating device for generating a point image as an additional image from point information output by another material presentation device and point information which is subtracted from an image of the virtual screen and the pointing mark photographed by the photographing section;
- an image synthesizing section for synthesizing the main image selected by the selecting device with the additional image generated by the point image generating device;
- an image displaying section for displaying the image synthesized by the image synthesizing section;
- a first outputting section for outputting the main image which is selected from plural images composed of the camera image of a material on the material mounting pedestal, which is photographed by the photographing section, the image stored in the memory device, and the external image output by the external device connected thereto;
- a second outputting section for outputting point information which is subtracted from the image photographed by the photographing section;
- a first inputting section for inputting the main image which is output by the first outputting section of another material presentation device;
- a second inputting section for inputting point information which is output by the second outputting section of another material presentation device; and
- an optical filter which is removably provided to the photographing section and which enables the photographing section to photograph only light emitted from the pointing mark, wherein when the user sets two arbitrary reference points by using the pointing mark on the material mounting surface, the photographing section photographs the two reference points, and coordinates on the virtual screen are generated by an image processing technique from a photographed image of the two arbitrary reference points photographed by the photographing section, so that the virtual screen is set to have a rectangular area based on the two arbitrary reference points.

* * * * *